(12) United States Patent  (10) Patent No.: US 9,060,123 B1
Daniel  (45) Date of Patent: Jun. 16, 2015

(54) SYSTEM AND METHOD FOR USING WI-FI INSIDE A MOVING VEHICLE

(75) Inventor: Isaac S. Daniel, Miramar, FL (US)

(73) Assignee: F3M3 Companies, Inc.

( * ) Notice: Subject to any disclaimer, the term of this patent is extended or adjusted under 35 U.S.C. 154(b) by 690 days.

(21) Appl. No.: 12/966,750

(22) Filed: Dec. 13, 2010

(51) Int. Cl.
H04N 5/232 (2006.01)

(52) U.S. Cl.
CPC ........... *H04N 5/23219* (2013.01); *H04N 5/232* (2013.01)

(58) Field of Classification Search
CPC ........................................ H04N 5/222
USPC .................................... 348/207.99
See application file for complete search history.

(56) References Cited

U.S. PATENT DOCUMENTS

| 2008/0245598 | A1* | 10/2008 | Gratz et al. ................... 180/287 |
| 2008/0281518 | A1  | 11/2008 | Dozier et al. |
| 2010/0330975 | A1  | 12/2010 | Basir |
| 2011/0137520 | A1* | 6/2011  | Rector et al. ..................... 701/36 |
| 2012/0088446 | A1* | 4/2012  | Fyke et al. .......................... 455/1 |
| 2012/0120239 | A1* | 5/2012  | Hutzel et al. .................. 348/143 |

* cited by examiner

Primary Examiner — James Hannett
(74) Attorney, Agent, or Firm — Carol N. Green Kaul, Esq.

(57) ABSTRACT

The present invention is directed to various systems, methods, and embodiments resulting from the realization that the number of persons who are using a Wi-Fi computer network in a closed environment, e.g. a moving vehicle, can be verified to confirm that it coincides with the number of persons allowed pursuant to a license, by providing a system and method for determining the number of persons accessing a computer network in a closed environment, e.g. a moving vehicle and controlling the access based on that determination.

30 Claims, 8 Drawing Sheets

SYSTEM AND METHOD FOR USING WI-FI INSIDE A MOVING VEHICLE

FIELD OF THE INVENTION

The present disclosure relates generally to electronic systems, and more particularly, to systems, methods, and various other disclosures related to using Wi-Fi inside a closed environment, e.g. a moving vehicle.

BACKGROUND

Wireless fidelity (Wi-Fi) access points, also known as "hot spots," are widely used and some would argue necessary to conduct business anywhere at anytime. Wi-Fi connections at these hot spots can be made over a secured computer network using password protection due to location ownership rights, while other connections are offered for free over an unsecured computer network at airports, train stations or restaurants by other Wi-Fi providers. However, as our lifestyles become more dynamic, there is an increased demand for hot spots that are readily available and easily identified.

Business travelers on the go are even more challenged to locate a usable hot spot to access their work environment as the hot spot's zone of coverage fluctuates as they travel. The need becomes even more pressing when business travelers spend a significant time driving or being driven to and from various locations during which work needs to be done but there is inconsistent access to the Internet to effectively complete work tasks. Most would prefer to use that travel time to work from their laptops and/or hand-held (or portable) computers/devices, such as personal digital assistants (PDAs), iPads, smart phones, cellular phones, and the like, but they are constrained by the lack of continuous Wi-Fi service. Thus, there needs to be an effective system and method of obtaining continuous Wi-Fi access inside a moving vehicle.

To date, the prior art has not yet found a workable solution to satisfy this long felt need. One can only surmise that car manufacturers and/or Wi-Fi providers are cautious in extending Wi-Fi access in moving vehicles as driving while texting has proven to be a dangerous habit. However, people's lifestyles dictate that other passengers may be travelling in a moving vehicle, through car pooling or being chauffeured, such that the passengers may have a valid need for Wi-Fi access, while the driver focuses his/her efforts on driving. Thus, there needs to be a system and method of distinguishing between the driver and the passengers accessing the Wi-Fi network in a moving vehicle, such that the much needed Wi-Fi access does not violate road safety rules. Accordingly, the various embodiments and disclosures described herein satisfies these long felt needs and solves the limitations of the prior art in a new and novel manner.

SUMMARY

The various systems, methods, and embodiments described herein result from the realization that the number of persons who are using a Wi-Fi computer network in a closed environment, e.g. a moving vehicle, can be verified to confirm that it coincides with the number of persons allowed pursuant to a license, by providing a system and method for determining the number of persons accessing a computer network in a closed environment, e.g. a moving vehicle and controlling the access based on that determination.

DETAILED DESCRIPTION OF PREFERRED EMBODIMENTS

System Level Overview

Figure 1A:
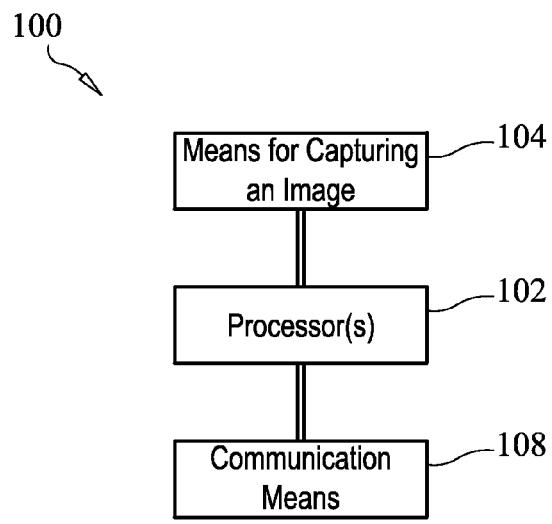
FIGS. 1A through 1E show a system in accordance with various embodiments.
Figure 1B:
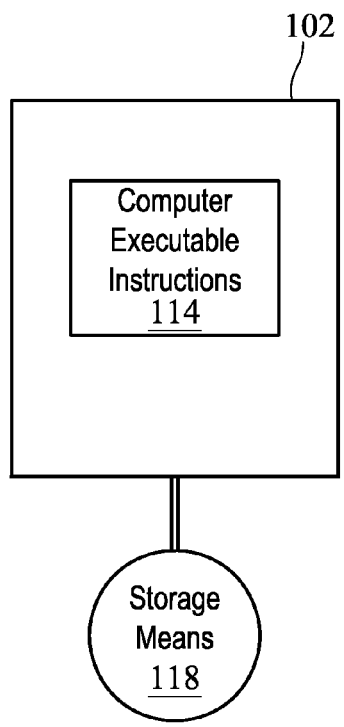
Figure 1C:
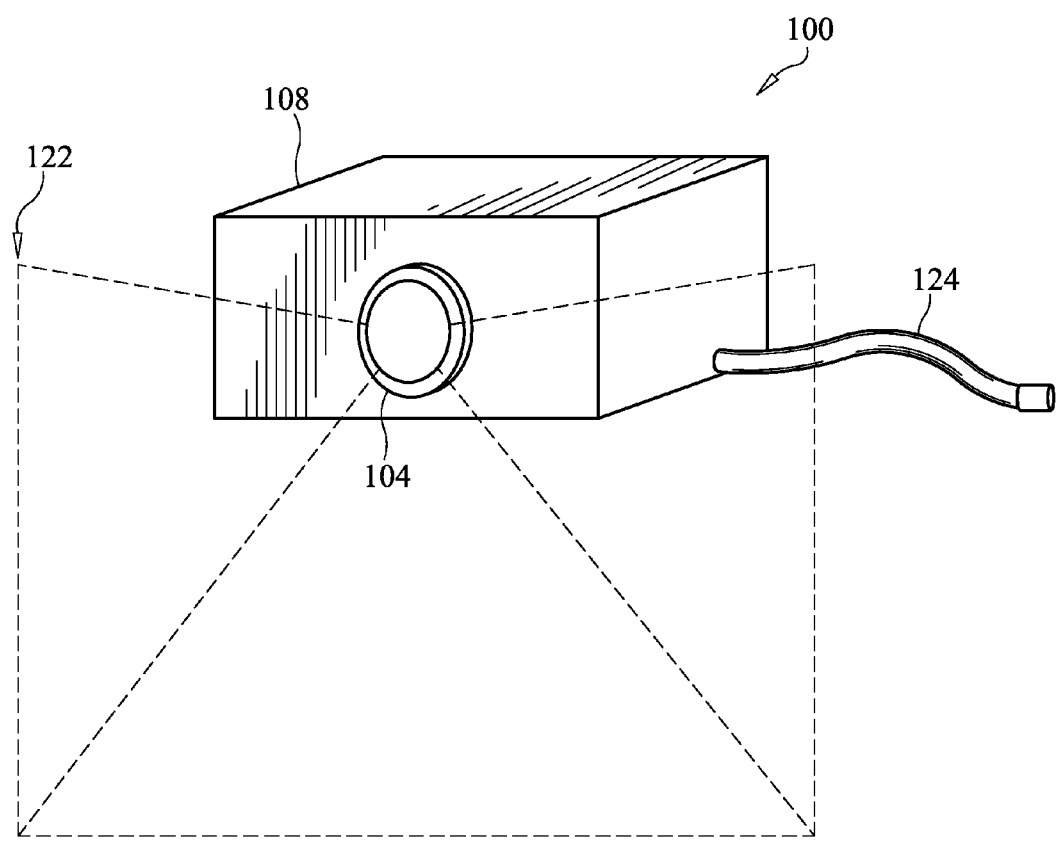
Figure 1D:
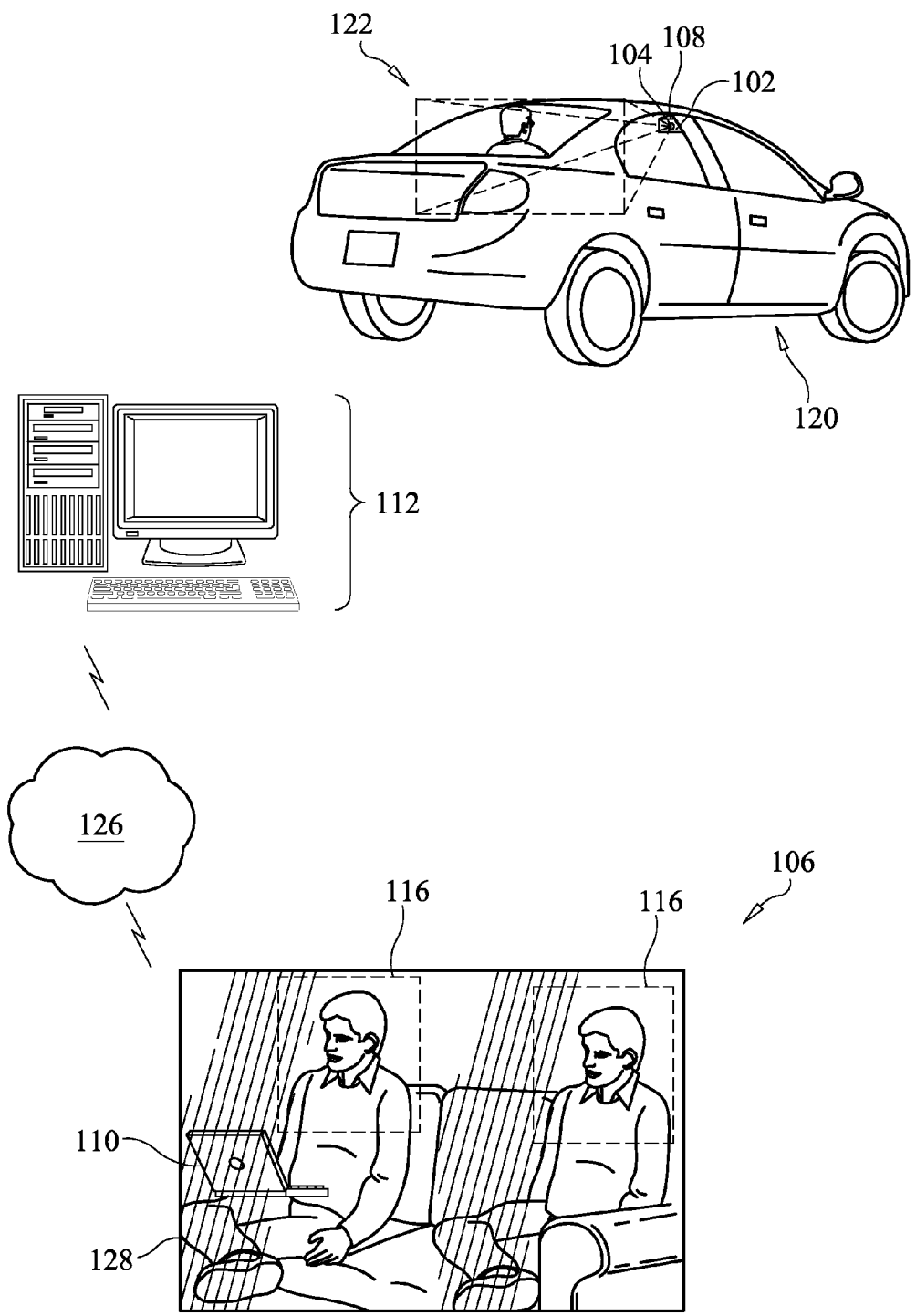

FIGS. 1A through 1E show a system 100 in accordance with some embodiments. In one embodiment, as shown in FIG. 1A, system 100 comprises of at least one computer processor 102; at least one means for capturing an image 104 (image 106 shown with reference to FIG. 1D), wherein the at least one means for capturing an image 104 is electronically connected to the at least one processor 102; at least one communication means 108 configured for establishing communications between a mobile device 110 and a computer network 112, wherein the at least one communication means 108 is electronically connected to the at least one computer processor 102; and computer executable instructions 114 readable by the at least one processor 102 and operative to analyze at least one image 106 captured by the at least one means for capturing an image 104, determine the number of persons 116 (as shown in FIG. 1D) that are in the at least one image 106, and control access to the computer network 112 based on the number of persons 116 determined to be in the at least one image 106.

In some embodiments, the at least one computer processor 102 may be any kind of processor, including, but not limited to, a central processing unit (CPU), a microprocessor, a video processor, a front end processor, a coprocessor, a single-core processor, a multi-core processor, and the like. At least one processor 102 may be positioned at any convenient location in a vehicle, such as under the dashboard, in the trunk, in the ceiling, under the steering column, under a seat, in the center console, in the engine bay, and/or any other practical location.

Referring to FIG. 1B, processor 102 may include hardware and software components, e.g. computer executable instructions 114. Computer executable instructions 114 may be loaded directly on the processor 102 or may be stored in a storage means 118. Computer executable instructions 114 may be any type of computer executable instructions 114, which may be in the form of a computer program, the program being composed in any suitable programming language or source code, such as C++, C, JAVA, JavaScript, HTML, XML, and other programming languages.

Processor 102 may be disposed in communication with the storage means 118, e.g. an electronic database for storing licensing information for at least one vehicle 120, e.g. the number of persons 116 authorized to access the computer network 112 pursuant to a license for that vehicle 120, and the like. Storage means 118 may include a hardware component, e.g. storage hardware. Such storage hardware may include, but is not limited to, read-only memory, such as CD-ROMs, DVDs, floppy disks, and the like, read and write memory, such as a hard drive, floppy disc, CD-RW, DVD-R, DVD-RW, solid state memory, such as solid state hard drives, flash memory, and the like, and random access memory. In another embodiment, storage means 118 may include a software component, such as, but not limited to, an electronic database, file management software, and any other software component as used in the arts. In yet another embodiment, storage means 118 may comprise of both hardware and software components.

As shown in FIG. 1C, the means for capturing an image 104 may be any such means, such as, but not limited to, a camera, an infrared camera, a thermal imaging camera, a video sensor, a digital camera, and the like. The means for capturing an image 104 may include a flash, which may be used to illuminate the number of persons 116 in the image 106. In a preferred embodiment, the means for capturing an image 104 may include a field of view 122 that encompasses all persons within the closed environment, e.g. a moving vehicle or a closed room or auditorium.

In some embodiments, the at least one means for capturing an image 104 is electronically connected to the at least one processor 102 by at least one connecting means 124 that may be any kind of means, such as a video connector, a coaxial cable, an HDMI cable, an s-video component connector, a Wi-Fi video transceiver, a Bluetooth video transceiver, an internal video cable socket, a DVI connector, and the like. Illustratively as shown in FIG. 1C, the at least one connecting means 124 is shown to include a cable, but it should be noted that such connecting means 124 may or may not include a cable.

Referring back to FIG. 1A, system 100 further comprises of the at least one communication means 108 configured for establishing communications between a mobile device 110 and a computer network 112, where such at least one communication means 108 is electronically connected to the at least one computer processor 102. Such communication means 108 may be any kind of means, including but not limited to, a wireless modem, such as a GSM modem, a wired modem, an Ethernet adapter, a Wi-Fi adapter, a wireless router functioning as the router of the electronic signals to or from the mobile device 110 to the computer network 112 as well as a wireless access point, i.e. allowing access to the Internet and/or a computer network 112 without the need for a cabled connection as is well known and used in the arts. In some embodiments, the computer network 112 may be a Wi-Fi service provider, such as, but not limited to, an Internet provider, a server computer, a television service provider, a movie provider, a sports media provider, a television station, and the like. In the preferred embodiment, such communication means 108 can function in a wired LAN (local area network), a wireless only LAN, or a mixed wired/wireless network acting as a wireless antennae establishing communications from other wireless devices, e.g. network interface cards ("NIC"), wireless repeaters, other wireless access points, and wireless bridges, for example), usually using the Wi-Fi standard.

In such embodiments, the computer executable instructions 114 may be further operative to use the at least one communication means 108 configured for communicating with a computer network 112 to transmit information 126 to or from the computer network 112. The information 126 may include data, media content, such as television shows, sports broadcasts, movies, and the like. Information 126 may also include the number of persons 116 authorized to access the system 100, view media content, billing information, and software updates. In some embodiments, a user may use system 100 to select and/or download the media to be viewed, and/or may update the number of persons 116 authorized to access the computer network 112 pursuant to the license for the subject vehicle, e.g. the Wi-Fi service provider.

Computer network 112 may be wired or wireless and may be available for use by the system 100 in a closed environment, e.g. an auditorium, a moving vehicle and/or a boat. In some embodiments, computer network 112 may be a part of a computer network which may be a closed computer network, such as, but not limited to, a local area computer network (LAN), a wide area computer network (WAN), an integrated services digital computer network, a dial-up computer network, or other forms of a closed computer network. In an alternate embodiment, the computer network may be an open computer network, such as, but not limited to, a world-wide-web, or other forms of an open computer network. In a further embodiment, system 100 may be connected to a server through a computer network 112, wherein the server is operative to receive data packets from the systems 100, 100' in the computer network 112.

In further embodiments, system 100 may comprise of at least one access means 128 configured for enabling electronic access between the mobile device 110 and the at least one communication means 108, wherein the at least one access means 128 is electronically connected to the at least one processor 102. In some embodiments, such access means 128 may include a Bluetooth module, a USB port, an infrared port, a computer network adapter, such as a Wi-Fi card, and the like.

Mobile device 110 as used herein may be any kind of electronic device configured for accessing a computer network 112, such as laptop and/or hand-held (or portable) computers/devices, such as personal digital assistants (PDAs), smart phones, cellular phones, and the like.

Referring to FIG. 1D, at least one or more images 106, 106' may be captured by at least one means for capturing an image 104 and analyzed by the processor 102 to determine if access to the computer network 112 comports with the license agreement for that vehicle 120. In some embodiments, the computer executable instructions 114 may include image recognition software and/or firmware, which may be used to analyze at least one image 106 captured by at least one means for capturing an image 106 to determine the number of persons 116 present in the at least one image 106, and consequently in the image capturing means' field of view 122. Such image recognition software may include facial recognition software, or may simply include general object recognition software configured for recognizing human shapes where for example the human form is readily distinguishable from that of an animal, yet does not intrude on the user's privacy by capturing their likeness. The terms "object recognition software," "facial recognition software," and "image recognition software," as used throughout the present disclosure, may refer to the various embodiments of object recognition software known in the art, including, but not limited to, those embodiments described in the following publications: *Reliable Face Recognition Methods: System Design, Implementation, and Evaluation*, by Harry Wechsler, Copyright 2007, Published by Springer, ISBN-13: 978-0-387-22372-8; *Biometric Technologies and Verification Systems*, by John Vacca, Copyright 2007, Elsevier, Inc., Published by Butterworth-Heinemann, ISBN-13: 978-0-7506-7967-1; and *Image Analysis and Recognition*, edited by Aurelio Campilho and Mohamed Kamel, Copyright 2008, Published by Springer, ISBN-13: 978-3-540-69811-1, all of which are herein incorporated by reference.

In some embodiments, the computer executable instructions 114 may be further operative to compare the number of persons 116 that are determined to be in the at least one image 106 with a number of persons 116 that are authorized to access the computer network 112. In some embodiments, the number of persons 116 that are authorized to access the computer network 112 may be pursuant to a license. In other embodiments, the number of persons 116 that are authorized to the access to the computer network 112 may be received from the computer network 112, such as a computer network 112 in communication with system 100. In yet other embodiments, the number of persons 116 that are authorized to access the computer network 112 may be contained on a piece of media hardware, such as a DVD, CD, and the like.

In a further embodiment, the computer executable instructions 114 may be operative to control access to the wireless computer network 112 from at least one or more mobile device 110, 110', if the number of persons 116 determined to be in the at least one image 104 exceeds the number of persons 116 authorized to access to the computer network 112. In some embodiments, controlling access to the computer network 112 includes, but is not limited to, ceasing access to the computer network 112, freezing access to the computer network 112, pausing access to the computer network 112, allowing access to the computer network 112, continuing to allow access to the computer network 112 or denying access to the computer network 112. In some embodiments, for example, if at the outset, the number of persons 116 who are determined to be accessing the computer network 112, as determined from the image 106 captured by the at least one means for capturing an image 104, exceeds the number of persons 116 authorized to do so, access to the computer network 112 may be denied to all.

In further embodiments, if the number of persons 116 accessing the computer network 112 at the outset is in accordance with the number of persons 116 authorized to access, but at a later time exceeds the number of persons 116 authorized, the computer executable instructions 114 may be configured to cease allowing access, pause or freeze access to the computer network 112 altogether. In a further embodiment, if the number of persons 116 accessing the computer network 112 at first exceeds the number of persons 116 authorized, but then later is reduced to or is less than the number of persons 116 authorized, the computer executable instructions 114 may be configured to begin access or continue allowing access to the computer network 112.

In some embodiments, system 100 may further comprise of means for receiving user input 130 (not shown), which in some embodiments, may be any type of means, including, but not limited to: a telephone modem: a key pad, a key board, a remote control, a touch screen, a virtual keyboard, a mouse, a stylus, a microphone, a camera, a fingerprint scanner, and a retinal scanner. In a further embodiment, system 100 may include a biometric identification means 132 (not shown) to identify the person accessing the computer network 112, such as a fingerprint scanner, an eye scanner, and facial recognition software.

Figure 1E:
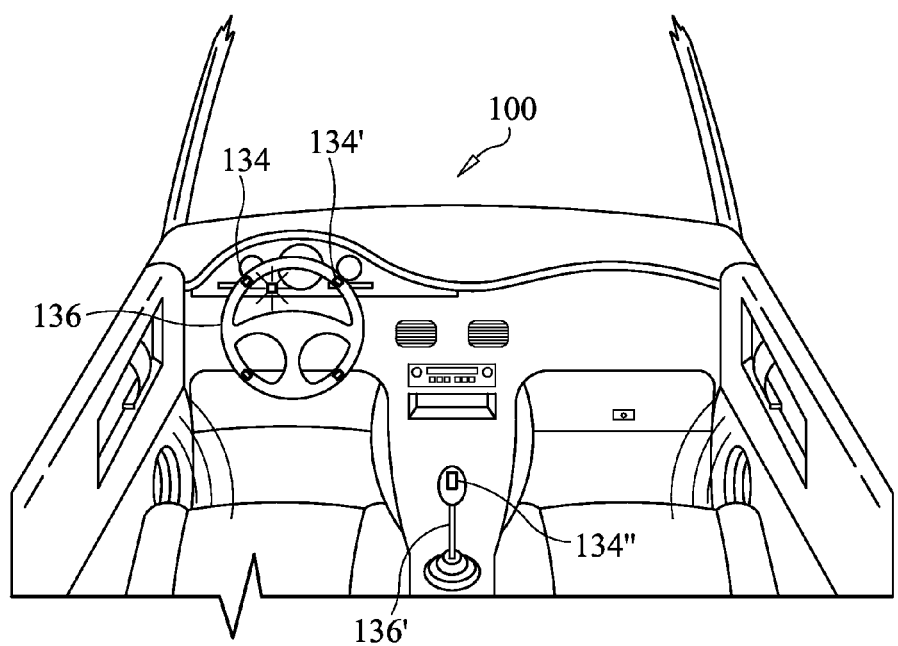

Referring to FIG. 1E, as shown, in some embodiments system 100 may comprise of at least one or more sensors 134, 134' in electronic communication with the at least one processor 102, wherein the at least one sensor 134, 134' may be electronically connected to at least one means for controlling a vehicle 136. The at least one sensor 134 may be any type of sensor, including, but not limited to, a video sensor, such as a camera, a motion sensor, and the like, an audio sensor, such as a microphone, a tactile sensor, such as a vibration sensor, a chemical sensor, such as an odor sensor, and the like, an electrical sensor, such as a capacitive sensor, a resistive sensor, and the like, and a thermal sensor, such as a heat sensor and/or infrared camera, pressure sensors, light sensors, optical sensors, photoelectric sensors, and the like, or any combination thereof. Such at least one sensor 134 may be positioned at the surface of means for controlling a vehicle 136. Such means for controlling a vehicle 136 may include but is not limited to: a steering wheel, a shifter, a lever, a pedal, a joystick, a button, keys, and the like. In such embodiments, at least one sensor 134 may be embedded within the means for controlling a vehicle 136 such that it can detect whether the vehicle 120 is in motion.

In embodiments throughout the present disclosure, the detection a sensor 134, working in conjunction with the processor 102, performs may comprise of sensing the changes in electrical capacitance created by the presence of an object, such as an driver's hand, sensing thermal changes created by the presence of an object such as an driver's hand and/or the temperature of the engine, or using image recognition software coupled to a camera to detect objects in the camera's field of view 122 including but not limited to the number of persons 116 determined to be in the at least one image 106. In some embodiments, a sensor 134 may be a camera positioned external to the means for controlling a vehicle 136, with its field of view 122 directed towards the driver and the driver's hands such that the sensor 134 may detect if a driver of the vehicle 120 is included in the at least one image 106 that was captured or if the vehicle 120 is in motion. In such embodiments, image recognition software which comprises of computer executable instructions 114 may be used to analyze the image 106 captured by the camera to determine whether the driver's hands are being used to drive. The results of the sensing performed by the sensor 134, 134' are provided to the processor 102 such that the computer executable instructions 114 can make a determination as to how to control access to the computer network 112. In some embodiments, computer executable instructions 114 are further operative to discontinue the driver's access to the computer network 112 if the driver of the vehicle 120 is detected as accessing the computer network 112 while the vehicle 124 is in motion.

Figure 2A:
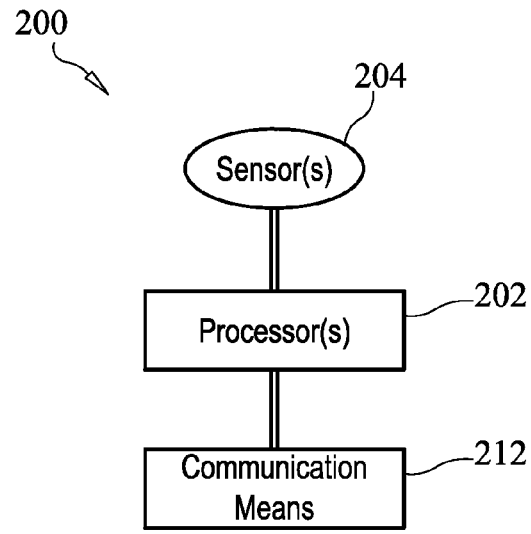
FIGS. 2A through 2D show a system in accordance with various embodiments.
Figure 2B:
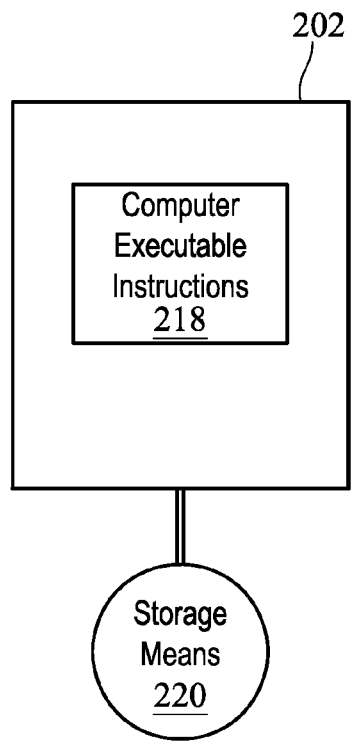
Figure 2C:
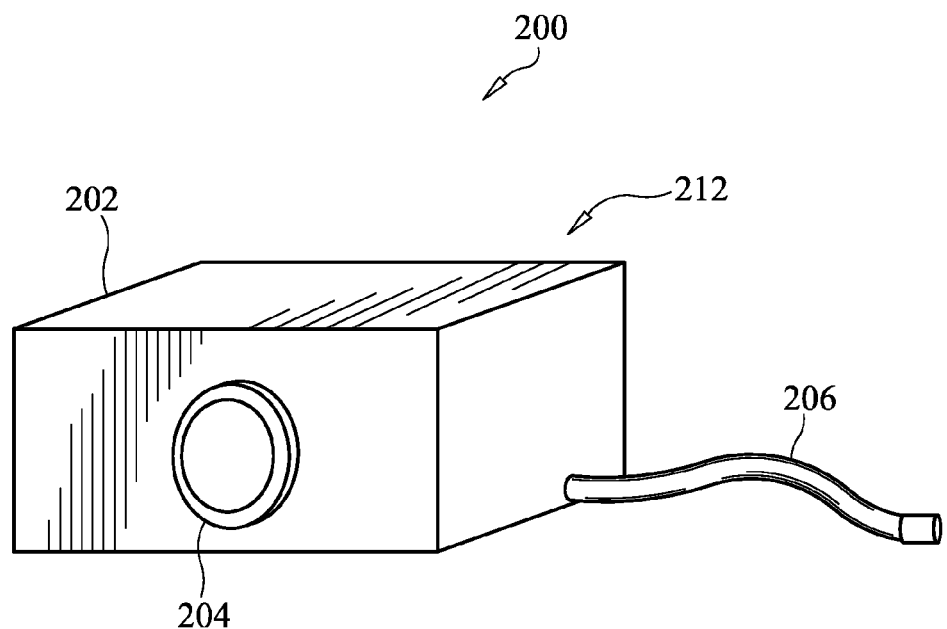
Figure 2D:
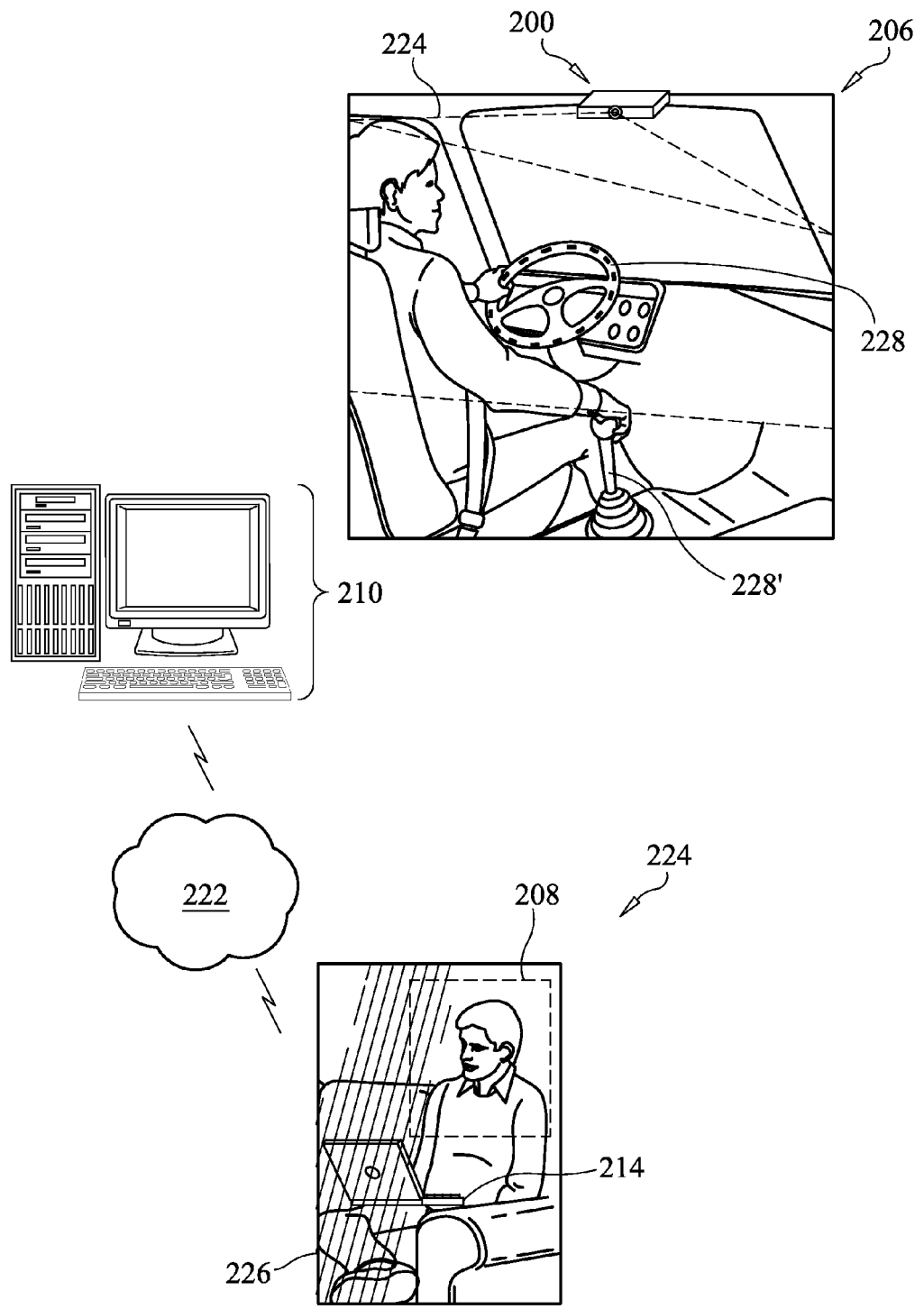

FIGS. 2A through 2D show system 200 in accordance with some embodiments. In one embodiment, as shown in FIG. 2A, system 200 comprises of at least one computer processor 202; at least one sensor 204 that is electronically connected to the at least one processor 202, wherein the at least one sensor 204 is positioned in a vehicle 206 and is configured for detecting a number of persons 208 accessing a computer network 210; at least one communication means 212 configured for establishing communications between at least one mobile device 214 and the computer network 210, wherein the at least one communication means 212 is electronically connected to the at least one processor 202; and computer executable instructions 218 readable by the at least one processor 202, and operative to use the at least one sensor 204 to determine the number of persons 208 (as shown in FIG. 2D) accessing the computer network 210 (as shown in FIG. 2D) in the vehicle 206.

In some embodiments, at least one computer processor 202 may be any kind of processor, including, but not limited to, a central processing unit (CPU), a microprocessor, a video processor, a front end processor, a coprocessor, a single-core processor, a multi-core processor, and the like. At least one processor 202 may be positioned anywhere in a vehicle 206, such as under the dashboard, under the steering column, under a seat, in the center console, in the engine bay, in the trunk, in the roof of the vehicle 206 and/or any other practical location.

The at least one sensor 204 may be any kind of sensor, including, but not limited to, a video sensor, such as a camera, a motion sensor, and the like, an audio sensor, such as a microphone, a tactile sensor, such as a vibration sensor, a chemical sensor, such as an odor sensor, and the like, an electrical sensor, such as a capacitive sensor, a resistive sensor, and the like, and a thermal sensor, such as a heat sensor and/or infrared camera, pressure sensors, light sensors, optical sensors, photoelectric sensors, and the like, or any combination thereof. The at least one sensor 204 may be positioned within the vehicle 206 in the same enclosure as the at least one processor 202 or alternatively, the at least one sensor 204 may be positioned remotely to the at least one processor 202.

In some embodiments, the at least one sensor 204 is electronically connected to the at least one processor 202 by at least one connecting means 216 that may be any kind of means, such as a video connector, a coaxial cable, an HDMI cable, an s-video component connector, a Wi-Fi video transceiver, a Bluetooth video transceiver, an internal video cable socket, a DVI connector, and the like. Illustratively as shown in FIG. 2C, the at least one connecting means 216 is shown to include a cable, but it should be noted that such connecting means 216 may include, or may not include a cable.

Processor 202 may include hardware and software components, e.g. computer executable instructions 218. As shown in FIG. 2B, computer executable instructions 218 may be loaded directly on the processor 202 or may be stored in a storage means 220. Computer executable instructions 218 may be any type of computer executable instructions, which may be in the form of a computer program, the program being composed in any suitable programming language or source code, such as C++, C, JAVA, JavaScript, HTML, XML, and other programming languages.

Processor 202 may be disposed in communication with the storage means 220, e.g. an electronic database for storing licensing information for at least one vehicle 206, e.g. the number of persons 208 authorized to access the computer network 210 pursuant to a license for that vehicle 206, and the like. Storage means 220 may include a hardware component, e.g. storage hardware, where such storage hardware may include, but is not limited to, the various types of hardware as described in conjunction with FIG. 1B. In another embodiment, storage means 220 may include a software component, such as, but not limited to, an electronic database, file management software, and any other software component as used in the arts. In yet another embodiment, storage means 220 may comprise of both hardware and software components.

Computer network 210 may be wired or wireless and available for use by the system 200 in a closed environment, e.g. an auditorium, a boat and/or a vehicle 206. In some embodiments, computer network 210 may be a part of a computer network which may be a closed computer network, such as, but not limited to, a local area computer network (LAN), a wide area computer network (WAN), an integrated services digital computer network, a dial-up computer network, or other forms of a closed computer network. In an alternate embodiment, the computer network 210 may be an open computer network, such as, but not limited to, a world-wide-web, or other forms of an open computer network. In a further embodiment, system 200 may be connected to a server through a computer network 210, wherein the server is operative to receive data packets from the systems 200, 200' in the computer network 210.

FIG. 2C is an exemplary embodiment of the system 200. The at least one communication means 212 is configured for establishing communications between a mobile device 214 and a computer network 210, where such communication means 212 is electronically connected to the at least one computer processor 202. Such communication means 212 may be any kind of means, including but not limited to, a wireless modem, such as a GSM modem, a wired modem, an Ethernet adapter, a Wi-Fi adapter, a wireless router for routing the electronic signals to or from the mobile device 214 to the computer network 210 as well as the functions of a wireless access point, i.e. allowing access to the Internet and/or a computer network 210 without the need for a cabled connection as is well known and used in the arts. In some embodiments, the computer network 210 may be a Wi-Fi service provider, such as, but not limited to, an Internet provider, a server computer, a television service provider, a movie provider, a sports media provider, a television station, and the like. In the preferred embodiment, such communication means 212 can function in a wired LAN (local area network), a wireless only LAN, or a mixed wired/wireless network acting as a wireless antennae establishing communications from other wireless devices, e.g. network interface cards ("NIC"), wireless repeaters, other wireless access points, and wireless bridges, for example), usually using the Wi-Fi standard. In some embodiments, the at least one sensor 204 may be positioned in the same enclosure as the at least one communication means 212, which may also include the at least one processor 202 electronically connected to both the at least one sensor 204 and/or the at least one communication means 212 as shown in FIG. 2C. Alternatively, the at least one sensor 204 may be positioned remotely to the at least one communication means 212.

In such embodiments, the computer executable instructions 218 may be further operative to use the at least one communication means 212 configured for communicating with a computer network 210 to transmit information 222 to or from the computer network 210. The information 222 may include data, media content, such as television shows, sports broadcasts, movies, and the like. Information 222 may also include the number of persons 208 authorized to access the system 200, view media content, billing information, and software updates. In some embodiments, a user may use system 200 to select and/or download the media to be viewed, and/or may update the number of persons 208 authorized to access the computer network 210 pursuant to the license for the subject vehicle, e.g. the Wi-Fi service provider.

In some embodiments, the computer executable instructions 218 may include object recognition software, i.e. computer executable instructions 218, such as image recognition software and/or firmware, which may be used to analyze the information 222 captured by the at least one sensor 204 and to determine the number of persons 208 present in the information 222, and consequently in the at least one sensor's field of sensing 224 as shown in FIG. 2D. Such object recognition software may include image recognition software, which may, in turn, include facial recognition software, or may simply include general visual object recognition software. In other embodiments, the object recognition software may be audio based, being able to distinguish objects (e.g. persons) that are producing certain audio (such as breathing, talking, etc.). In yet a further embodiment, the object recognition software may include a plurality of sensors 204, 204' to determine the number of persons accessing the computer network 212 in a vehicle 206.

In some embodiments, the computer executable instructions 218 may be further operative to control access to computer network 210 based on the number of persons 208 determined to be accessing the computer network 212 in the vehicle 216. In some embodiments, the computer executable instructions 218 may be further operative to compare the number of persons 208 that are determined to be accessing the computer network 212 in the vehicle 206 with a number of persons 208 that are authorized to access the computer network 212. In a further embodiment, computer executable instructions 218 may be operative to control access to the computer network 212 if the number of persons 208 determined to be accessing the computer network 212 exceeds the number of persons authorized to accessing the computer network 212 in the vehicle 206.

In some embodiments, controlling access to the computer network 212 in a vehicle includes, but is not limited to, ceasing to allow access to the computer network 212 in a moving vehicle, pausing access to the computer network 212 in a moving vehicle, allowing access to the computer network 212 in a moving vehicle, freezing access to the computer network 212 in a moving vehicle, continuing to allow access to the computer network 212 in a moving vehicle or denying access to the computer network 212 in a moving vehicle. In some embodiments, for example, if at the outset of access to the computer network's 212, the number of persons 208 who are determined to be attempting to access the computer network 210 in the vehicle 206 exceeds the number of persons 208 authorized to do so, access to the computer network 212 for all potential users may be denied. In further embodiments, if the number of persons 208 accessing the computer network 212 at the outset is in accordance with the number of persons 208 authorized to accessing the computer network 212, but at a later time exceeds the number authorized, the computer executable instructions 218 may pause, freeze, or cease access to the computer network 212 in a moving vehicle altogether. In a further embodiment, if the number of persons 208 accessing the computer network 212 in a moving vehicle at first exceeds the number authorized, but then later is reduced to or below the number of persons 208 authorized, the computer executable instructions 218 may begin or continue allowing access to the computer network 212 in a moving vehicle.

In further embodiments, system 100 may comprise of at least one access means 226 configured for enabling electronic access between the mobile device 214 and the at least one communication means 212, wherein the at least one access means 226 is electronically connected to the at least one processor 202. In some embodiments, such access means 226 may include a Bluetooth module, a USB port, an infrared port, a computer network adapter, such as a Wi-Fi card, and the like. Mobile device 214 as used herein may be any kind of electronic device configured for accessing a computer network 210, such as laptop and/or hand-held (or portable) computers/devices, such as personal digital assistants (PDAs), smart phones, cellular phones, and the like.

In some embodiments, system 200 may comprise of at least one or more sensors 204, 204' in electronic communication with the at least one processor 202, wherein the at least one sensors 204, 204' may be electronically connected to at least one means for controlling a vehicle 228. The at least one sensor 204 may be any type of sensor, including, but not limited to, a video sensor, such as a camera, a motion sensor, and the like, an audio sensor, such as a microphone, a tactile sensor, such as a vibration sensor, a chemical sensor, such as an odor sensor, and the like, an electrical sensor, such as a capacitive sensor, a resistive sensor, and the like, and a thermal sensor, such as a heat sensor and/or infrared camera, pressure sensors, light sensors, optical sensors, photoelectric sensors, and the like, or any combination thereof. Such at least one sensor 204 may be positioned at the surface of means for controlling a vehicle 228. Such means for controlling a vehicle 228 may include but is not limited to: a steering wheel, a lever, a pedal, a shifter, a joystick, a button, keys, and the like. In such embodiments, at least one sensor 204 may be embedded within the means for controlling a vehicle 228 such that it can detect when the vehicle 206 is in motion.

In embodiments throughout the present disclosure, the detection a sensor 204 performs may comprise of sensing the changes in electrical capacitance created by the presence of an object, such as an driver's hand, sensing thermal changes created by the presence of an object and/or the temperature of the engine, or in embodiments wherein the sensor 204 includes a camera, the sensor 204 may use image recognition software coupled to the camera to detect objects in the camera's field of view 224 and/or the number of persons 208 determined to be accessing the computer network 210. In some embodiments, a sensor 204 may be a camera positioned external to the means for controlling a vehicle 228, with its field of sensing 224 directed towards the driver and the driver's hands such that the sensor 204 may detect if a driver of the vehicle 206 is included in the information 222, e.g. at least one image that was captured or if the vehicle 206 is in motion. In such embodiments, image recognition software may be used to analyze the image captured by the camera to determine whether the driver's hands are being used to drive. The results of the sensing performed by the at least one or more sensors 204, 204' are provided to the processor 202 such that the computer executable instructions 218 can make a determination as to how to control access to the computer network 210. The computer executable instructions 218 are further operative to discontinue the driver's access to the computer network 210 if the driver of the vehicle 120 is detected as accessing the computer network 112 while the vehicle 124 is in motion.

In some embodiments of the system 200, the at least one sensor 204 is in electronic communication with the at least one processor 202 as well as alarm notification means 230. Alarm notification 230 means may comprise of a vibration motor electronically connected to, for example, a circuit board capable of causing a vibration, or may include Dual-tone multi-frequency ("DTMF") decoders also electronically connected to the circuit board and speaker capable of sounding an audible alarm; a single tone alert system sounding an alarm like a Sonalert; or the processor 202 may be electronically connected to a display element programmed to flash a light thereon on receipt of an alarm, created as a result of the driver having been detected as accessing the computer network 210 while the vehicle 206 is in motion. As such, the alarm notification means 230 may cause a vibration or the sounding of an alarm or the flashing of a display element in case the driver is detected as accessing the computer network within the moving vehicle 206.

Methods

Figure 3:
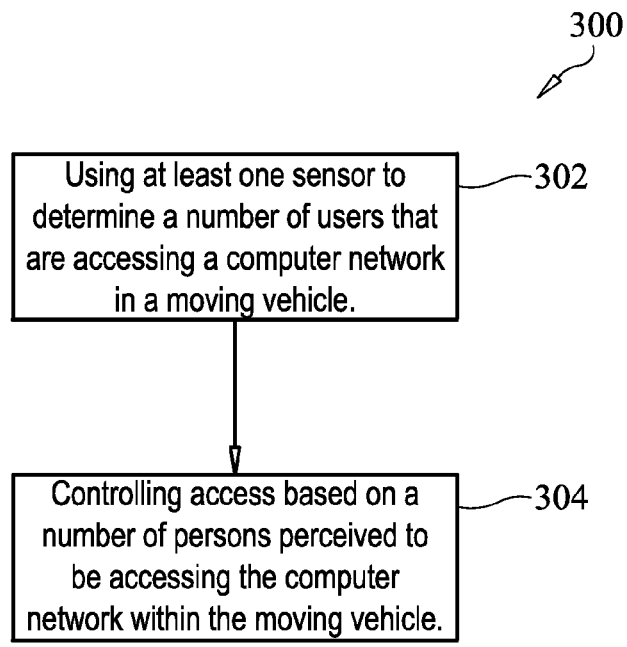
FIG. 3 shows a flow diagram representing a method in accordance with one embodiment.

FIG. 3 shows a flow diagram representing an embodiment of method 300, wherein method 300 comprises of using at least one sensor 104 to determine a number of persons 116 that are accessing a computer network 112 in a moving vehicle 120 (step 302) and controlling access based on the number of persons 116 that are determined to be accessing the computer network 118 within the moving vehicle 120 (step 304).

In some embodiments, the at least one sensor 204 may be any kind of sensor 204, including, but not limited to, a video sensor, such as a camera, a motion sensor, and the like, an audio sensor, such as a microphone, a tactile sensor, such as a vibration sensor, a chemical sensor, such as an odor sensor, and the like, an electrical sensor, such as a capacitive sensor, a resistive sensor, and the like, and a thermal sensor, such as a heat sensor and/or infrared camera, pressure sensors, light sensors, optical sensors, photoelectric sensors, and the like, or any combination thereof.

In a further embodiment of method 300, controlling access to the computer network based on the number of persons 116 detected accessing the computer network 112 comprises any or all of the following: pausing access to the computer network 112 in a moving vehicle 120 when the number of persons 116 accessing the computer network 112 exceeds a number of persons 116 authorized to access the computer network 112 in a moving vehicle 120, continuing to allow access to the computer network 112 in a moving vehicle 120 when the number of persons 116 accessing the computer network 112 is equal to or less than the number of persons 116 authorized to accessing the computer network 112 in a moving vehicle 120 pursuant to a license, and ceasing access to the computer network 112 in a moving vehicle 120 when the number of persons 116 accessing the computer network 112 exceeds the number of persons 116 authorized to accessing the computer network in a moving vehicle 120. Moving vehicle as used herein includes automobiles, such as cars, vans, boats, trucks, sport utility vehicles, and the like.

In a further embodiment, method 300 comprises any or all of the following steps: allowing at least one user to register for at least one broadcast of at least one program, using at least one image recording means to capture at least one image of the at least one user, and using at least one processor to analyze the image and determine how many users are in the image, and begin, continue, or cease broadcasting or displaying the program based on how many users are determined to be in the image. In some embodiments, method 300 further comprises using at least one processor to begin broadcasting the program if the amount of users determined to be in the image corresponds to the amount of users registered for the broadcast.

In some embodiments, method 300 further comprises using at least one processor to continue broadcasting the program if the amount users determined to be in the image corresponds to the amount of users registered for the broadcast.

In some embodiments, method 300 further comprises using at least one processor to cease broadcasting the program if the amount users determined to be in the image does not correspond to the amount of users registered for the broadcast.

In some embodiments, method 300 further comprises using at least one processor to carry out any of the aforementioned steps, or any other steps described in the present disclosure.

In some embodiments, method 300 may be implemented as a computer readable medium having computer executable instructions. The term "computer readable medium," as used throughout this disclosure, may refer to any computer readable medium, such as CD-ROMs, CD-Rs, CD-RWs, floppy disks, hard drives, flash drives, diskettes, solid state drives, tape drives, and any other form of computer readable medium.

In some embodiments method 300 may be integrated wholly, or in part, into systems 100 and 200 described above, as well as other systems and methods described throughout the present disclosure. In some embodiments, method 300 may be carried out using the various systems described throughout the present disclosure.

Hardware and Operating Environment

This section provides an overview of exemplary hardware and the operating environments in conjunction with which embodiments of the inventive subject matter can be implemented.

A software program may be launched from a computer readable medium in a computer-based system to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 4 below.

Figure 4:
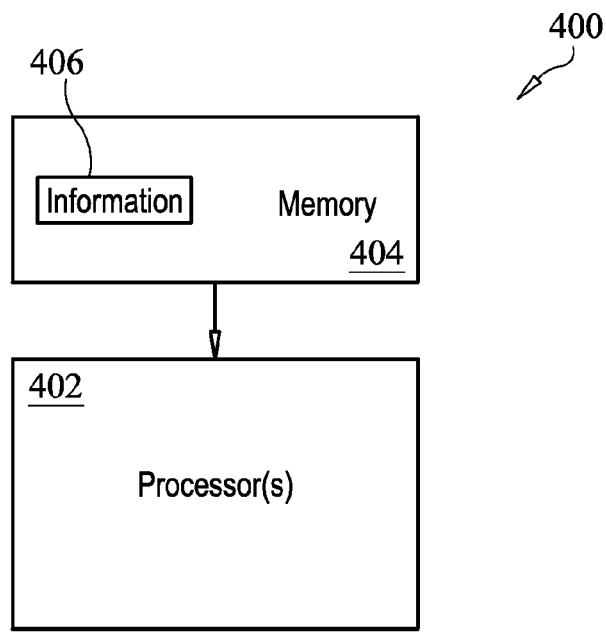
FIG. 4 shows an article in accordance with one embodiment.

FIG. 4 is a block diagram representing an article according to various embodiments. Such embodiments may comprise a computer, a memory system, a magnetic or optical disk, some other storage device, or any type of electronic device or system. The article 400 may include one or more processor(s) 402 coupled to a machine-accessible medium such as a memory 404 (e.g., a memory including electrical, optical, or electromagnetic elements). The medium may contain associated information 406 (e.g., computer program instructions, data, or both) which, when accessed, results in a machine (e.g., the processor(s) 402) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
   at least one processor;
   at least one means for capturing an image, wherein the at least one means for capturing an image is electronically connected to the at least one processor;
   at least one communication means configured for establishing communications between a mobile device and a computer network, wherein the at least one communication means is electronically connected to the at least one processor; and
   computer executable instructions readable by the at least one processor and operative to:
   analyze at least one image captured by the at least one means for capturing an image;
   determine the number of persons that are in the at least one image to determine number of persons that are accessing a computer network in the vehicle; and
   control access to the computer network but not the vehicle for at least one mobile device and any other mobile devices within the vehicle, by comparing the number of persons determined to be in the at least one image with a number of persons that are authorized to access the computer network, and allowing access to the computer network for the at least one mobile device and any other mobile devices within the vehicle if the number of persons accessing the computer network is in accordance with the number of persons authorized for access pursuant to a license for the vehicle.

2. The system of claim 1, wherein the computer executable instructions are further operative to control access to the computer network by allowing access to the computer network for the at least one mobile device and any other mobile devices if the number of persons accessing the computer network at first exceeds the number of persons authorized, but then later is reduced to, or is less than the number of persons authorized for access pursuant to a license for the vehicle.

3. The system of claim 2, wherein the computer executable instructions are further operative to control access to the wireless computer network if the number of persons determined to be in the at least one image exceeds the number of persons authorized to access the computer network.

4. The system of claim 1, wherein controlling access to the wireless computer network includes any or all of the following: ceasing access, pausing access, freezing access, allowing access, continuing to allow access or denying access.

5. The system of claim 1, further comprising of at least one sensor in electronic communication with the at least one processor, wherein the at least one sensor may be electronically connected to at least one means for controlling a vehicle.

6. The system of claim 5, wherein the at least one sensor may be any type of sensor, including, but not limited to: a capacitive sensor, a thermal sensor, temperature sensor, a pressure sensor, a light sensor, an optical sensor, a photoelectric sensor.

7. The system of claim 5, wherein the at least one sensor may perform any one or more of the following: sensing the changes in electrical capacitance created by the presence of an object, sensing thermal changes created by the presence of an object or the temperature of the engine, or using image recognition software coupled to a camera to detect objects in the camera's field of view or number of persons determined to be in the at least one image.

8. The system of claim 5, wherein the at least one sensor is configured for detecting any one or more of the following: if a driver of a vehicle is included in the at least one image that was captured, or if the vehicle is in motion.

9. The system of claim 8, wherein the computer executable instructions are further operative to discontinue the driver's access to the computer network if the driver of the vehicle is detected as accessing the computer network, while the vehicle is in motion.

10. The system of claim 1, further comprising of at least one means for communicating with a computer network within a vehicle is electronically connected to the at least one processor.

11. The system of claim 10, wherein the computer executable instructions are further operative to use the at least one means for communicating with a computer network within a vehicle to transmit information to or from the computer network.

12. The system of claim 11, wherein the information is any or all of the following types of information: data, media content, the number of persons authorized to access to the computer network, billing information, and software updates.

13. A system comprising:
at least one processor;
at least one sensor that is electronically connected to the at least one processor, wherein the at least one sensor is positioned in a vehicle and is configured for detecting a number of persons accessing a computer network but not the vehicle;
at least one communication means configured for establishing communications between at least one mobile device and a computer network, wherein the at least one communication means is electronically connected to the at least one processor; and
computer executable instructions readable by the at least one processor and operative to:
use the at least one sensor for sensing changes in electrical capacitance created by the presence of an object, sensing thermal changes created by the presence of an object or the temperature of the engine, or using image recognition software coupled to a camera to detect objects in the camera's field of view or number of persons determined to be in the at least one image to determine number of persons accessing the computer network in the vehicle; and
control access to the computer network but not the vehicle for at least one mobile device and any other mobile devices within the vehicle, by comparing the number of persons determined to be accessing the computer network within the vehicle with a number of persons that are authorized to access the computer network, and allowing access to the computer network for the at least one mobile device and any other mobile devices within the vehicle if the number of persons accessing the computer network is in accordance with the number of persons authorized for access pursuant to a license for the vehicle.

14. The system of claim 13, wherein the computer executable instructions are further operative to control access to the computer network based on the number of persons determined to be accessing the computer network in the vehicle.

15. The system of claim 13, wherein the computer executable instructions are further operative to allow access to the computer network for the at least one mobile device and any other mobile devices if the number of persons accessing the computer network at first exceeds the number of persons authorized, but then later is reduced to, or is less than the number of persons authorized for access pursuant to a license for the vehicle.

16. The system of claim 13, wherein the computer executable instructions are further operative to control the access to the computer network if the number of persons determined to be accessing the computer network exceeds the number of persons authorized to access the computer network in the vehicle.

17. The system of claim 13, wherein controlling access to the wireless computer network includes any or all of the following: ceasing access, pausing access, allowing access, freezing access, continuing to allow access or denying access.

18. The system of claim 13, wherein the at least one sensor is electronically connected to at least one means for controlling a vehicle.

19. The system of claim 13, wherein the at least one sensor may be any type of sensor, including, but not limited to: a video sensor, a capacitive sensor, a thermal sensor, temperature sensor, a pressure sensor, a light sensor, an optical sensor, a photoelectric sensor.

20. The system of claim 13, wherein the at least one sensor is configured for detecting any one or more of the following: if a driver of a vehicle is determined to be accessing the computer network, or if the vehicle is in motion.

21. The system of claim 20, wherein the computer executable instructions are further operative to discontinue the driver's access to the computer network if the driver of the vehicle is detected as accessing the computer network, while the vehicle is in motion.

22. The system of claim 20, further comprising an alarm for providing notification if the driver of the vehicle is detected as accessing the computer network, while the vehicle is in motion.

23. The system of claim 13, further comprising of at least one means for communicating with a computer network is electronically connected to the at least one processor.

24. The system of claim 20, wherein the computer executable instructions are further operative to use the at least one means for communicating with a computer network to receive information from the computer network.

25. The system of claim 24, wherein the information is any or all of the following types of information: viewer content, the number of persons authorized to access to the computer network, billing information, and software updates.

26. A method comprising using at least one processor to perform any or all of the following:
   using at least one sensor for sensing changes in electrical capacitance created by the presence of an object, sensing thermal changes created by the presence of an object or the temperature of the engine, or using image recognition software coupled to a camera to detect objects in the camera's field of view or number of persons determined to be in the at least one image to determine number of persons that are accessing a computer network; and
   controlling the access to the computer network but not the vehicle for at least one mobile device and any other mobile devices within the vehicle, by comparing the number of persons that are perceived to be accessing the computer network as determined to be in the at least one image with a number of persons that are authorized to access the computer network, and allowing access to the computer network for the at least one mobile device and any other mobile devices within the vehicle if the number of persons accessing the computer network is in accordance with the number of persons authorized for access pursuant to a license for the vehicle.

27. The method of claim 26, wherein the at least one sensor is a type of sensor selected from the group consisting essentially of: a visual sensor, an audio sensor, a tactile sensor, a thermal sensor, a chemical sensor, an electrical sensor, a capacitive sensor, a resistive sensor, a camera, a thermal imaging camera, and a microphone.

28. The method of claim 26, wherein controlling access to the computer network includes any one or more of the following:
   a) pausing access to the computer network in a moving vehicle when the number of persons accessing the computer network exceeds a number of persons authorized to accessing the computer network in a moving vehicle;
   b) allowing access to the computer network in a moving vehicle when the number of persons perceived to be accessing the computer network is equal to or less than the number of persons authorized to access the computer network in a moving vehicle; and
   c) ceasing access to the computer network in a moving vehicle when the number of persons perceived to be accessing the computer network exceeds the number of persons authorized to access the computer network in a moving vehicle.

29. A non-transitory computer readable medium having computer executable instructions for performing a method comprising
   using at least one sensor for sensing changes in electrical capacitance created by the presence of an object, sensing thermal changes created by the presence of an object or the temperature of the engine, or using image recognition software coupled to a camera to detect objects in the camera's field of view or number of persons determined to be in the at least one image to determine a number of persons that are accessing a computer network; and
   controlling access to the computer network but not the vehicle for at least one mobile device and any other mobile devices within the vehicle, by comparing the number of persons detected that are accessing the computer as determined to be in the at least one image with a number of persons that are authorized to access the computer network, and allowing access to the computer network for the at least one mobile device and any other mobile devices within the vehicle if the number of persons accessing the computer network is in accordance with the number of persons authorized for access pursuant to a license for the vehicle.

30. The method of claim 29, wherein controlling access to the computer network based on the number of persons accessing the computer network comprises any or all of the following:
   pausing access to the computer network in a moving vehicle when the number of persons accessing the computer network exceeds a number of persons authorized to accessing the computer network in a moving vehicle;
   allowing access to the computer network in a moving vehicle when the number of persons perceived to be accessing the computer network is equal to or less than the number of persons authorized to access the computer network in a moving vehicle; and
   ceasing access to the computer network in a moving vehicle when the number of persons perceived to be accessing the computer network exceeds the number of persons authorized to access the computer network in a moving vehicle.

* * * * *